(12) United States Patent
Jueneman

(10) Patent No.: US 6,678,967 B1
(45) Date of Patent: Jan. 20, 2004

(54) MAGNETIC TIP FOR TAPE MEASURE AND METHOD OF USE

(76) Inventor: Michael Jueneman, 7126 Timothy St., Anchorage, AK (US) 99502

( * ) Notice: Subject to any disclaimer, the term of this patent is extended or adjusted under 35 U.S.C. 154(b) by 116 days.

(21) Appl. No.: 09/686,649

(22) Filed: Oct. 10, 2000

Related U.S. Application Data

(60) Provisional application No. 60/164,475, filed on Nov. 10, 1999.

(51) Int. Cl.[7] ................................................. G01B 3/10
(52) U.S. Cl. ............................................ 33/758; 33/770
(58) Field of Search ........................... 33/770, 760, 758, 33/DIG. 1

(56) References Cited

U.S. PATENT DOCUMENTS

| | | | |
|---|---|---|---|
| 2,663,941 A | 12/1953 | Dart | 33/768 |
| 3,036,791 A | 5/1962 | Biggelkow | 242/379.2 |
| 3,109,242 A * | 11/1963 | Nyitrai | 33/537 |
| 3,145,477 A | 8/1964 | Morrison | 33/770 |
| 4,352,244 A * | 10/1982 | Tomuro | 33/757 |
| 4,353,167 A | 10/1982 | Martin | 33/770 |
| 4,580,347 A | 4/1986 | McKnight | 33/760 |
| 4,827,622 A | 5/1989 | Makar | 33/770 |
| 4,924,597 A | 5/1990 | Tursi | 33/758 |
| 5,006,799 A * | 4/1991 | Pfanstiehl | 324/230 |
| 5,046,262 A * | 9/1991 | Kerbaugh | 33/644 |
| 5,103,574 A * | 4/1992 | Levy | 33/760 |
| 5,402,583 A | 4/1995 | Komura | 33/758 |
| 5,421,100 A | 6/1995 | Leore | 33/770 |
| 5,481,813 A | 1/1996 | Templeton | 33/758 |
| 5,544,420 A * | 8/1996 | Choi | 33/760 |
| 5,815,940 A * | 10/1998 | Valentine, Sr. | 33/770 |
| 6,070,338 A | 6/2000 | Garity | 33/760 |
| 6,073,983 A | 6/2000 | Schroeder | 294/65.5 |
| 6,115,931 A * | 9/2000 | Arcand | 33/668 |
| 6,226,886 B1 * | 5/2001 | Lamond et al. | 33/769 |
| 6,442,863 B1 * | 9/2002 | Poineau et al. | 33/758 |

FOREIGN PATENT DOCUMENTS

| | | | | |
|---|---|---|---|---|
| DE | 3141635 A | * | 4/1983 | G01B/3/10 |
| FR | 2492519 A | * | 4/1982 | G01B/3/10 |
| JP | 59-121922 | * | 7/1984 | 33/758 |
| JP | 406281401 A | * | 10/1994 | G01B/3/10 |
| JP | 2003121103 A | * | 4/2003 | G01B/3/10 |

* cited by examiner

Primary Examiner—Diego Gutierrez
Assistant Examiner—R. Alexander Smith
(74) Attorney, Agent, or Firm—Angenehm Law Firm; N. Paul Friederichs

(57) ABSTRACT

A measuring device including a mechanism for measuring such as a tape measure, the mechanism for measuring having a end hook; and a mechanism for selectively securing, such as a magnet, the tape to an object, such as a pipe, the mechanism for selective securing being attached to the end hook of the mechanism for measuring.

10 Claims, 2 Drawing Sheets

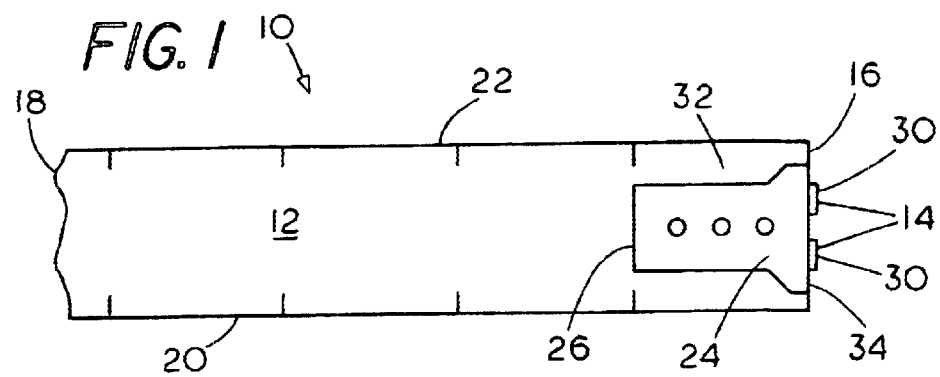
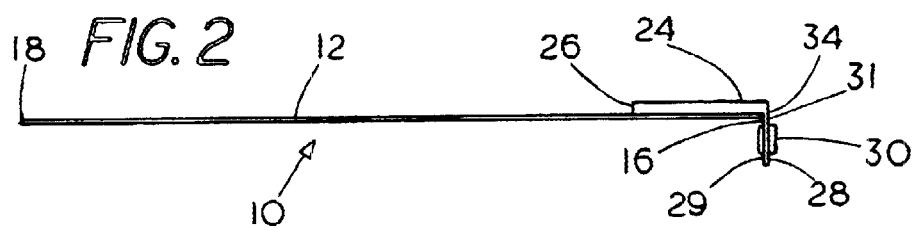
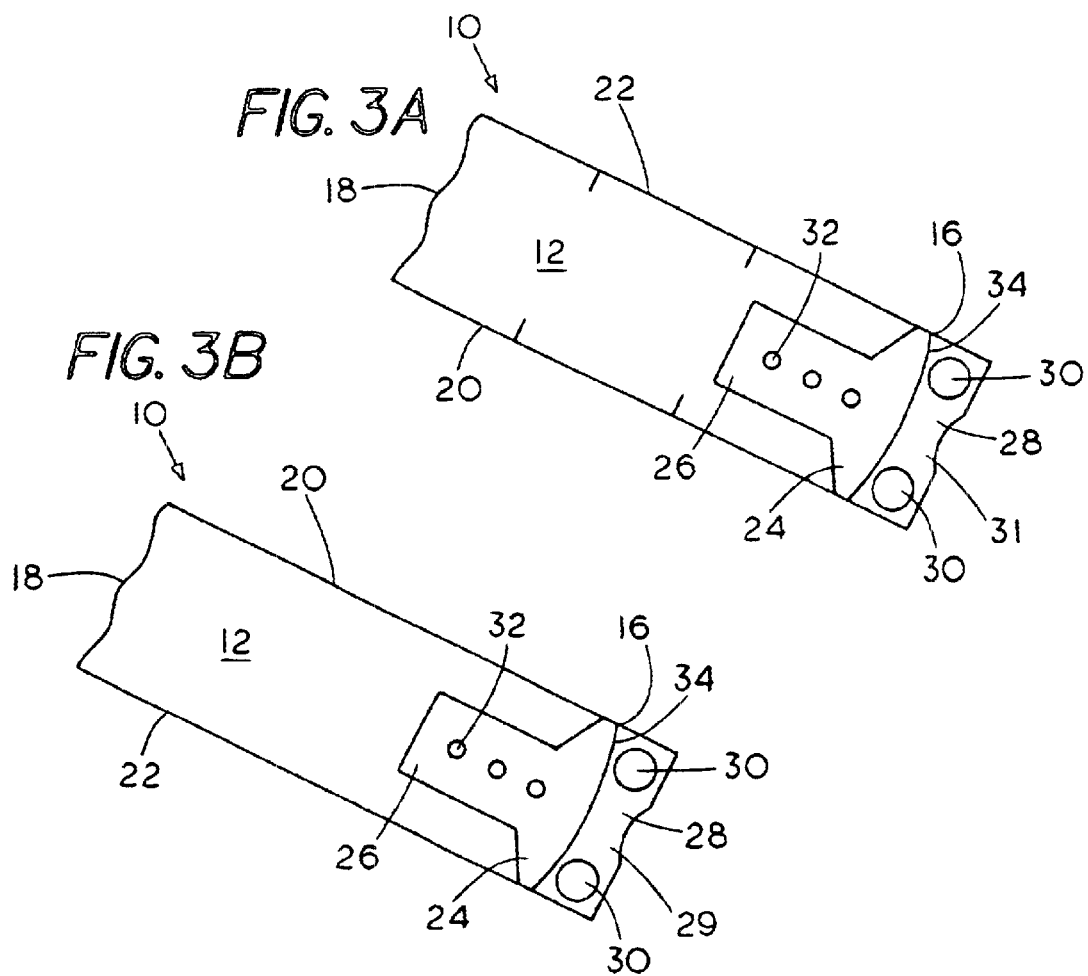

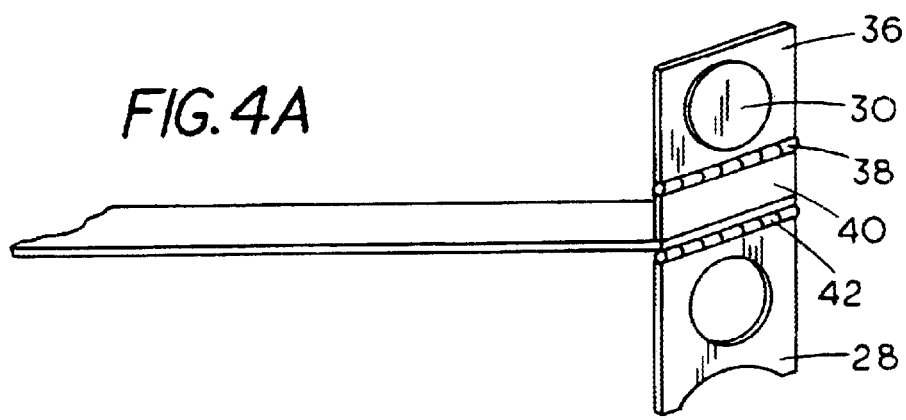
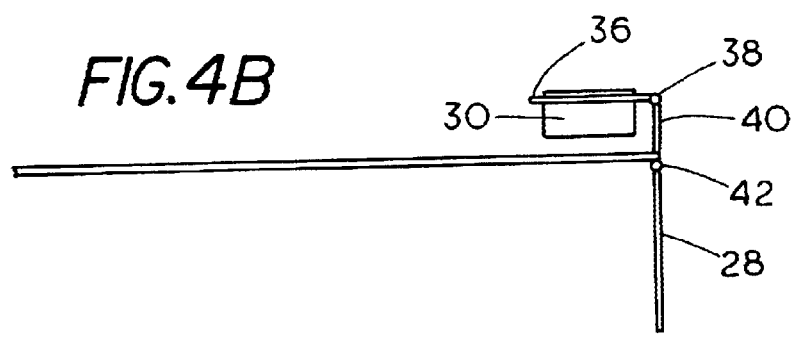
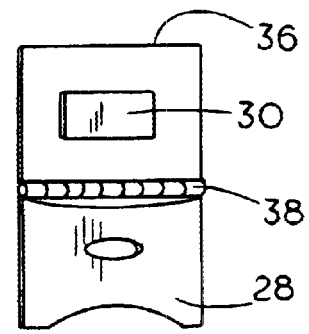
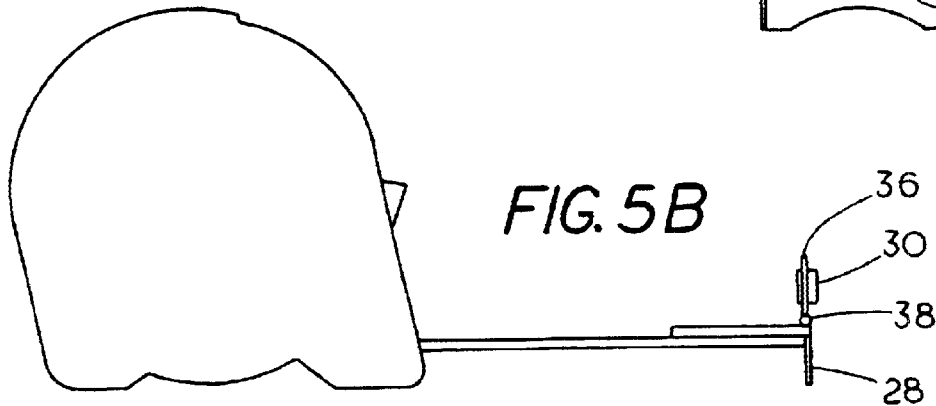

MAGNETIC TIP FOR TAPE MEASURE AND METHOD OF USE

The present application claims priority from provisional patent application No. 60/164,475, entitled MAGNETIC TIP FOR TAPE MEASURE AND METHOD OF USE, filed Nov. 10, 1999 and from patent application Ser. No. 09/541,491, now abandoned, entitled MAGNETIC TIP FOR TAPE MEASURE AND METHOD OF USE, filed Apr. 3, 2000.

FIELD OF INVENTION

This invention relates to measuring devices, specifically to such devices with an active mechanism for attachment to the object being measured.

BACKGROUND

People use and have used measuring devices for a very long time. Some measuring devices that are used today are tape measures and rulers. When a person is measuring a long distance (more than 12 inches) usually that person will use a tape measure.

Typical tape measures range from a few feet to considerably more than one hundred feet. Tape measures commonly have a tip, or end hook, at one end of the tape. The end hook is placed at one end of a board, pipe, or other object being measured. The end hook is generally ½ inch to ¾ inch long.

A person measuring an object will place the end hook at one end of the object. Next, the person stretches out the tape measure to the opposite end of the object. The end hook of the tape measure will slip off the first end of the object. The person replaces the end hook at the first end and again stretches out the tape measure. This may be repeated several times until the person is able to obtain an accurate measurement of the object. Alternatively, the person may use a second person with each person holding one end of the tape. What is needed is an improved end hook for securing the end of a tape to an object being measured.

Frequently, a person may drop objects while working on a home improvement project, working in their garage, constructing an object such as a building or other similar activities. Some of the objects that may be dropped are screws, nails, bolts, washers or other objects. Generally these objects will fall into places where people have a very difficult time reaching them such as behind a large object or into a small opening. Recovering the object often requires climbing down a ladder to pick it up and back up the ladder to do the job. What is needed is a common device that a construction worker carries that can more easily retrieve dropped objects.

Several inventions have been designed with a magnetic attachment. Each of these, however, are of an unsound structure that would fail Federal specifications for tape measuring devices and industry standards. For instance, many of the prior art devices show the magnet substantially exposed. Magnets are known to be brittle and easily break when dropped. Test 4.4.3.2 of the Federal standards require a drop test, whereby the tape is dropped ten times from a height of five feet onto a flat steel plate to strike edgewise against the plate. The tape is then to be examined to determine if any permanent distortion of the tape which would affect the tape has taken place. Drops of this sort crack and destroy the exposed magnets of prior inventions.

Other standards require the tape to be accurate to 1/32nd of an inch. Prior art magnets are of such thickness that the tape cannot be accurate. Federal standards require the tape to be extended thirty-six inches, but industry standards require the tape to be extended seven or more feet, with the tip unsupported. While extended under either standard the tape cannot bend over. Prior magnets are of size and weight that they routinely bend the tape over. Japanese standards, which American products should meet in the ever increasing world market structure, have similar tests. The aforementioned standards generally relate to Type V, classes A and B. Similar federal, trade and Japanese tests are used on other types and classes of tapes. The prior art fails to meet or provide education on how to meet the standards under the various types and classes.

What is needed is a tape measure with a magnetic tip that is sized and structured in a manner that allows the tapes to pass the drop tests, horizontal extension tests and other U.S. federal, trade and Japanese standards for performance.

SUMMARY

The present invention allows the person to measure a metal object once by placing the magnetic mechanism on the end hook of the tape measure at one end. The magnetic mechanism releasably attaches to the metal object, thus, securing it to one end of the object. The person then stretches out the tape measure and obtains an accurate measurement of the object.

The present invention further allows the user to easily pick up objects dropped into very small openings, behind large objects and otherwise difficult to reach objects. The person simply places the end hook of the tape measure onto the opening being retrieved. The magnetic mechanism will releasably attach to the dropped object. The person then retracts the tape measure and removes the dropped object from the magnetic mechanism.

The present invention has a unique structure, embedding the magnets in the tip of the tape measure. The magnets of high gauss may remain small and inserted into openings defined in the tip end. These may be set in place and a flattening force applied to the tip to hold the magnet in with friction force (adhesive, metal plating, coating, and/or welds may also be used if desired, but are not necessary), and making the magnet generally co-planer with the tip end of a tape measure. The magnet being shielded by the tip end and being small in size allow the tape to pass the drop test, horizontal extension test and the co-planer feature allows the tape to remain accurate.

In accordance with the present invention, a measuring device comprising a measuring mechanism with an end hook and a magnetic mechanism removably or permanently attached to the end hook.

DESCRIPTION OF THE FIGURES

FIG. 1 is a top view of the present invention;

FIG. 2 is a side view of the present invention;

FIG. 3A is a top perspective view of the present invention;

FIG. 3B is a bottom perspective view of the present invention;

FIG. 4A is a perspective view of an embodiment of the present invention in a Type I tape;

FIG. 4B is a front perspective view of an embodiment of the present invention in a Type I tape;

FIG. 5A is a perspective view of an embodiment of the present invention in a Type V tape; and FIG. 5B is a front perspective view of an embodiment of the present invention in a Type V tape.

DETAILED DESCRIPTION

The present inventive device 10, shown in FIGS. 1 through 3, includes a measuring mechanism 12 for measuring objects and a magnetic attraction mechanism 14 for providing a releasable attachment to objects. These mechanisms 12 and 14 are described below more fully.

The measuring mechanism 12 may be a typical tape measure or other suitable measuring device. The measuring mechanism 12 may be of a variety of lengths, widths, and shapes. The length needs to be long enough to be useful in measuring objects of a variety of sizes. The measuring mechanism 12 may include indicia using the metric system, the American system or other suitable measuring system. The length may range from shorter than six inches to longer than several hundred feet. The preferable length ranges from approximately three feet to fifty feet. The width may range from one-quarter inch to more than two inches. The preferable width ranges from approximately one-half inch to approximately one inch. The measuring mechanism 12 may be of a variety of shapes. The preferable shape is rectangular having a first end 16 and a second end 18, a right side 20, and a left side 22.

The measuring mechanism 12 may be made of any suitable material. The material needs to avoid degradation so that the measuring mechanism 12 does not break or crack during use. The weight is not overly important, although the measuring mechanism 12 preferably is a weight that is easily portable and remains within federal, trade and Japanese standards. The measuring mechanism 12 may be made of wood, hard plastic, steel, stainless steel, nylon, aluminum, or other suitable materials.

The measuring mechanism 12 may include a tape end hook 24. The tape end hook 24 may be a standard tape end hook used with typical tape measuring devices. The tape end hook 24 may vary in shape. The preferred shape is approximately rectangular. The tape end hook 24 may have an attachment end 26 and a hook end 28. The attachment end 26 and the hook end 28 may be divided by a bend 34 in the tape end hook 24. The hook end 28 of the end hook 24 may have a hooking surface 29 and a butting surface 31.

The length, width, and material of the tape end hook 24 may vary. The length of the tape end hook 24 may range from less than one inch to more than three inches. The length preferably will be approximately one and three-fourth inches. The width of the tape end hook 24 may be approximately the same width as the measuring mechanism 12 or the width of the tape end hook 24 may be more or less than the width of the measuring mechanism 12. Preferably, the width of the tape end hook 24 will be slightly less than the width of the measuring mechanism 12. The tape end hook 24 may be made of hard plastic, steel, stainless steel, nylon, aluminum or any other suitable material.

The attachment end 26 of the tape end hook 24 may be attached near the first end 16 of the measuring mechanism 12. The first end 16 of the measuring mechanism 12 may lay adjacent to the bend 34 in the tape end hook 24. The attachment end 26 may be attached near the first end 16 using any suitable attachment mechanism 32 such as pins or any other suitable attachment mechanism.

The tape end hook 24 may be permanently attached to the first end 16 or the tape end hook 24 may be removably attached to the first end 16. The tape end hook 24 may be removably attached using at least one snap, a hook and loop mechanism, a button and buttonhole, or other removable attachment mechanism. The tape end hook 24 may be permanently attached to the first end 16 using permanent pins, rivets, permanent glue, or other permanent attachment mechanism.

The magnetic attraction mechanism 14 may include at least one magnet 30. Preferably, the magnetic attraction mechanism 14 will include at least two magnets 30. The magnet material may be any known material that will provide a magnetic attraction including neodymium-iron-boron, samarium cobalt, alnico, ceramic ferrite or any other magnetic material. The magnetic strength may be very slight such as 2,200 gauss to very strong such as 20,000 gauss. The preferred magnet is neodymium-iron-boron of 11,400 to 13,550 gauss, with the most preferred 13,550. The magnets 30 preferably are attached to or in magnetic communication with the hook end 28 of the tape end hook 24. The magnets 30 may be attached using any suitable attachment mechanism.

The preferred embodiment has openings defined in the end hook 28 sized to receive the magnets. The magnets 30 are approximately the same thickness of the end hook 24 and the same size as the openings. The magnets 30 are situated in the holes and then pressed, friction fitting them and embedding them into the end hook 24. Embedding the magnets 30 into the openings provides sufficient structural integrity to withstand forces encountered in standard drop tests. Welds, adhesives, metal plating (which may be magnetic), coatings or other securing methods or devices may be used, but have generally been found to be unnecessary. The magnets 30 should be generally co-planer with the surfaces of the end hook 24, thus maintaining the accuracy of the tape. The magnets 30 which may vary in size, but preferably are between ⅛ inch and ½ inch in diameter and the thickness of the end hook 24 are found to be of a weight light enough that the invention 10 passes horizontal extension tests.

The invention 10 is easily used. The hook end 28 is placed adjacent to any metal object, such as metal stud framing, needing to be measured. The magnets 30 are attracted to the metal object, thus, holding the hook end 28 in place. The measuring process may then be completed.

The invention 10 may also be used for reaching and removing nuts, bolts, or other metal objects located in small areas where a person may be unable to reach. This may be accomplished by using the measuring mechanism 12 to place the hook end 28 with the magnets 30 into the small area containing the metal object. The magnets 30 will attract the metal object. The hook end 28 is then lifted out of the small area using the measuring mechanism 12.

In an alternative embodiment, the end hook 28 may include a magnet 30 embedded in a frame 36, which is joined via a hinge 38 to the end hook. FIG. 4 shows a Type I class A or B tape measure, which may be 50', 100', 200' or other length together with a hinged end hook 28. A segment 40 may be joined to the hinge 42 of the end hook 28 and to the hinge 38 of the frame 36. The segment 40 allows the magnet 30 to be thicker, but still should remain sufficiently thin to allow the tape to pass the applicable accuracy tests for tapes. FIG. 5 shows a Type V tape, which has a fixed angle end hook 28. The hinge 38 may join directly to the end hook 28 and the frame 36. The magnet 30 is preferably embedded into the frame 36. In this embodiment, the frame 36 and magnet 30 may be folded out of the way or down into position where they function as an end hook 28.

Although the present invention has been described with reference to preferred embodiments, workers skilled in the art will recognize changes may be made in form and detail without departing from the spirit and scope of the invention.

I claim:

1. A measuring device comprising:

a tape measure having a housing joined to a tape;

an end hook joined to an end of the tape, the end hook having an attachment end and a hook end, the attachment end being joined to the tape, the hook end having a hooking surface and a butting surface; and at least one magnet compression fitted within the end hook, the magnet extending through the end hook such that the magnet is part of the hooking surface and part of the butting surface, and the magnet being exposed to a material to be measured at the hooking surface and at the butting surface.

2. The device of claim 1 wherein the at least one magnet comprises a plurality of magnets.

3. The device of claim 1 wherein the magnet has a minimum residual induction Gauss of 13,550.

4. The device of claim 1 wherein the magnet is permanently attached to the end hook.

5. The device of claim 1 wherein the magnet is adapted to be selectively attachable to pipes.

6. The device of claim 1 wherein the magnet is adapted to be selectively attachable to metal wall studs.

7. The device of claim 1 wherein the magnet is adapted to be selectively attachable to iron beams.

8. A method of manufacturing a tape measure comprising:

providing a tape measure having a housing joined to a tape;

providing an end hook having an attachment end and a hook end, the hook end having a hooking surface and a butting surface;

joining the attachment end of the end hook to an end of the tape, and compression fitting at least one magnet within the end hook and the magnet forming part of the hooking surface and part of the butting surface.

9. The method of claim 8 wherein the at least one magnet comprises a plurality of magnets and the step of compressing fitting the at least one magnet comprises the step of compression fitting the plurality of magnets within the end hook of the tape measure.

10. The method of claim 8 wherein the magnet has a minimum residual induction Gauss of 13,550.

* * * * *